United States Patent [19]

Kil et al.

[11] Patent Number: 5,364,687
[45] Date of Patent: Nov. 15, 1994

[54] DOORMAT AND APPARATUS FOR PRODUCING THE SAME

[75] Inventors: Kee S. Kil; Woon H. Whang; Kang Y. Lee, all of Choongchungbuk-do, Rep. of Korea

[73] Assignee: Lucky, Ltd., Seoul, Rep. of Korea

[21] Appl. No.: 935,522

[22] Filed: Aug. 25, 1992

[30] Foreign Application Priority Data

Dec. 27, 1990 [KR] Rep. of Korea .................... 90-21958

[51] Int. Cl.$^5$ .......................... B32B 3/28; A23G 1/22
[52] U.S. Cl. .................................... 428/184; 428/182; 428/192; 428/212; 5/417; 425/113; 425/131.5; 425/396
[58] Field of Search ............... 428/182, 184, 33, 192, 428/212; 52/795, 799, 800; 5/417; 425/113, 131.5, 336, 369, 396

[56] References Cited

U.S. PATENT DOCUMENTS

| | | | |
|---|---|---|---|
| 3,235,440 | 2/1966 | Gould | 428/182 |
| 3,893,795 | 7/1975 | Nauta | 425/403 |
| 4,631,215 | 12/1986 | Welygan et al. | 428/184 |

FOREIGN PATENT DOCUMENTS 0199537 10/1986 European Pat. Off. .
942712 5/1956 Germany .
2107054 11/1972 Germany .

Primary Examiner—Donald J. Loney
Attorney, Agent, or Firm—Michael N. Meller

[57] ABSTRACT

An article is provided comprising a plurality of straight spaced parallel extruded elements separated by a regularly undulated extruded element having an aspect ratio of at least about two, with undulations having opposed apexes on either side thereof, with apexes on one side of the undulated element being bonded to one of the parallel extruded elements and the apexes on the other side of the undulated element being bonded to the other of said parallel extruded elements. The article is formed by extruding a first filament-forming extrudable plastic mass to form a plurality of straight spaced continuous parallel elements, extruding (at a faster extrusion rate and between adjacent parallel element) a second filament-forming extrudable plastic mass to form an undulatable element which is thinner than it is wide to provide a cross-section with an aspect ratio of at least about two, causing the undulatable element to undulate in its thin dimension and to bond to the straight spaced continuous parallel elements, and changing or permitting the change of the formed, extruded plastic mass so that subsequent bonding will no longer occur and so that the elements have sufficient structural integrity to maintain their extruded bonded shape.

4 Claims, 6 Drawing Sheets

5,364,687

DOORMAT AND APPARATUS FOR PRODUCING THE SAME

TECHNICAL FIELD

The present invention relates to a doormat and an apparatus for producing the same. In particular, it relates to a doormat which has good cushiony effect by space due to corrugation of synthetic resin sheet when people coming and going step on it laid on a door or a gate, eliminates well muck from the outsole of shoes because of its good restoring force and elasticity, is also convenient to use and may prevent slip because of various convexities formed on the surface of corrugated band, and to an apparatus which comprises simple structure and is used in preparing easily the above doormat.

BACKGROUND OF THE ART

Various kinds of doormats have been used bacause a room was stained with muck adhered to the outsole of shoes in the case of entering a room with stained shoes.

Up to date, metallic coil spring bonded in a state of sheet or pile has been used as a doormat. Recently, the synthetic resin was extruded in a fine fiber, and then the fibers got tangled with each other irregularly in a state of coil, the sheet obtained was used as doormat. Among them, the doormat made of metallic coil spring easily eliminated muck adhered to the outsole of shoes. Such metallic doormat, however, has a disadvantage that it was difficult to shake fine muck from boots since scrapable effect was reduced by crushing of matallic coil spring in using doormat. Other disadvantage was that it had poor feeling by hardness. Also, the doormat made of pile had disadvantages that it was inconvenient in wetting and therefore it had to be dry, furthermore, it could hardly eliminate muck. Also, although the third doormat eliminated well muck adhered to the outsole of shoes, which muck in aperture of coil irregularly tangled was hardly eliminated.

SUMMARY OF THE INVENTION

Accordingly, the object of the present invention is to provide the doormat having excellent cushiony effect due to space formed by corrugation of synthetic resin sheet so as to solve the above problems of the doormats.

Other object of the present invention is to provide the doormat having effect to eliminate excellently muck adhered to the outsole of shoes because of its good restoring force and elasticity.

Another object of the present invention is to provide the apparatus which comprises simple structure and may easily prepare the above doormat.

DETAILED DESCRIPTION

The synthetic resin composition formed into the doormat according to the present invention must be composed of the materials which have excellent waterproofing, wear resistance, soluble property, elasticity and the likes. The example of organic polymers having such characteristics are polyvinyl chlorides, polyesters, polyurethanes, polypropylenes, polyethylenes, polystyrenes and various synthetic rubber.

The illustrations in FIG. 1 to FIG. 12 more clearly show the preferred embodiment of the present invention.

Figure 1:
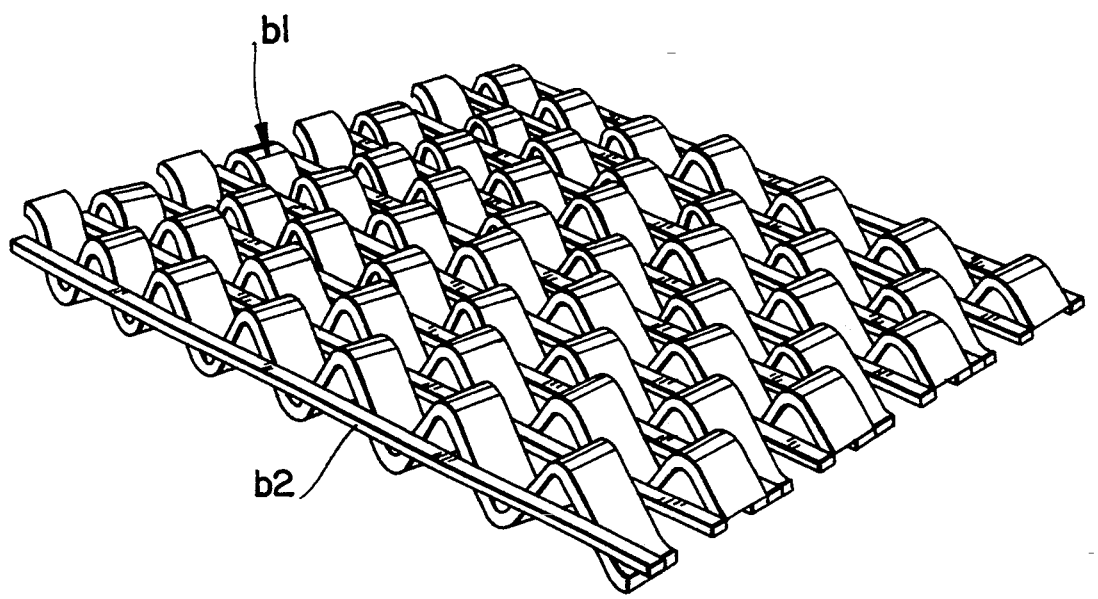
FIG. 1 is a perspective view of the doormat according to the present invention.

As illustrated in FIG. 1 which is a perspective view of the doormat according to the present invention, the plural and continuous bands ($b_1$) having 1 to 5 mm of thickness and 2 to 20 mm of width are combined alternately with the straight bands ($b_2$) having 0.2 to 5 mm of thickness and 2 to 20 mm of width, or only the corrugated bands ($b_1$) are combined in different phases to give the doormat of the FIG. 1.

Figure 2:
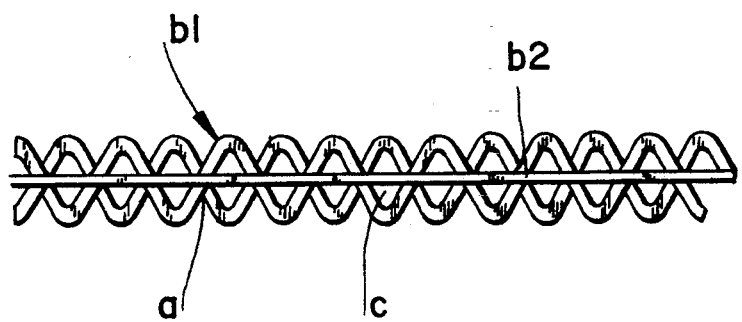
FIG. 2 is a side view of the above doormat.

FIG. 2 is a side view of the above doormat, a corrugated band has different phase against next corrugated band and such corrugated bands having different phases with each other are combined alternately. As a result, holes are formed in space between the corrugated band ($b_1$) and the straight band ($b_2$).

Accordingly, the space due to phase difference of the above corrugated bands ($b_1$) gives us good cushiony effect so that feeling is good at stepping on the above doormat. Also, since it has good restoring force and elasticity, muck adhered to the outsole of shoes is easily removed.

Figure 3:
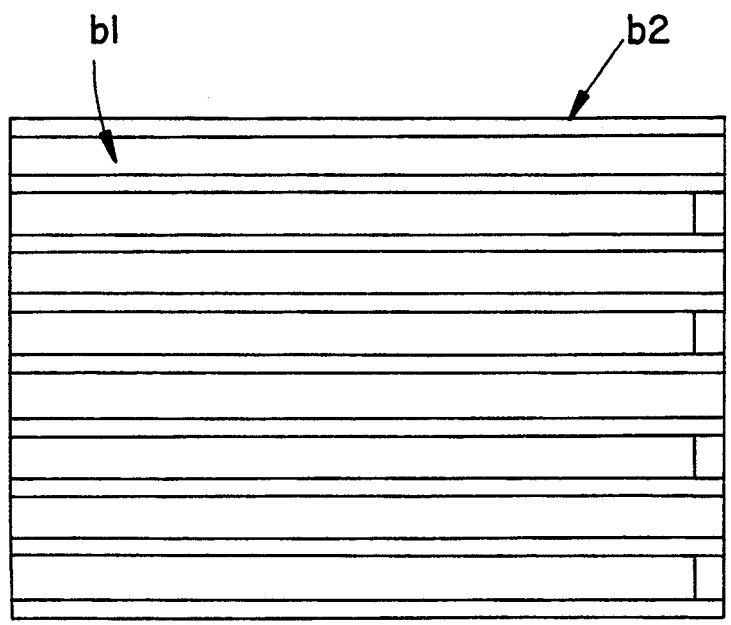
FIG. 3 is a plane view of the above doormat.
Figure 4:
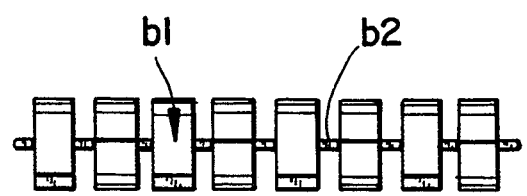
FIG. 4 is a front view of the above doormat.

FIG. 3 is a plane view of the above doormat and FIG. 4 is a front view of the above doormat.

Figure 5:
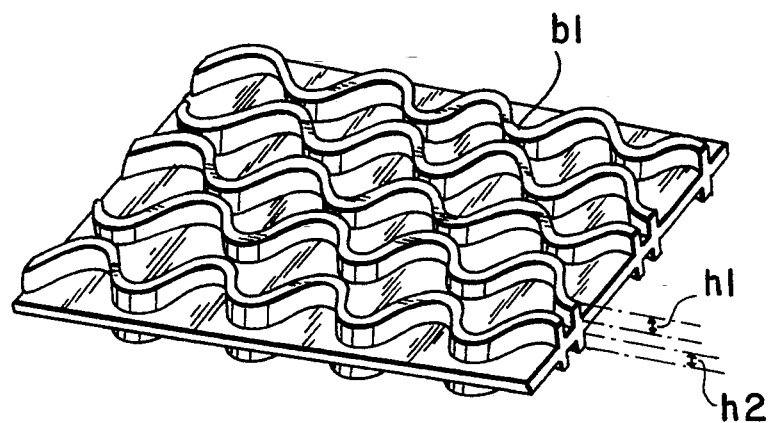
FIG. 5 is an alternative embodiment of the doormat according to the present invention.

FIG. 5 is an alternative embodiment of the doormat according to the present invention. Since a width ($h_1$) of the corrugated band ($b_1$) may be differ from other width ($h_2$) thereof, bending and stretching force is distributed. Accordingly, the doormat has better good feeling in use and it is fashionalble because of graceful external appearance.

Figure 6:
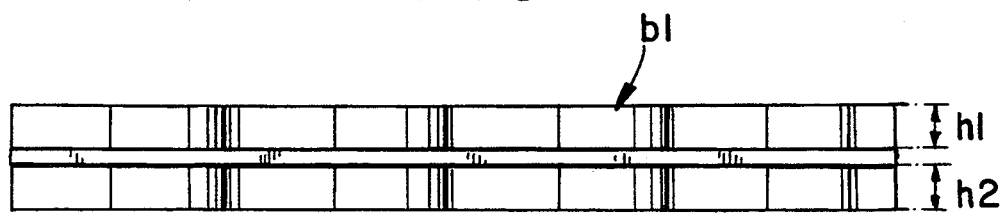
FIG. 6 is a side view of the doormat represented in FIG. 5.
Figure 7:
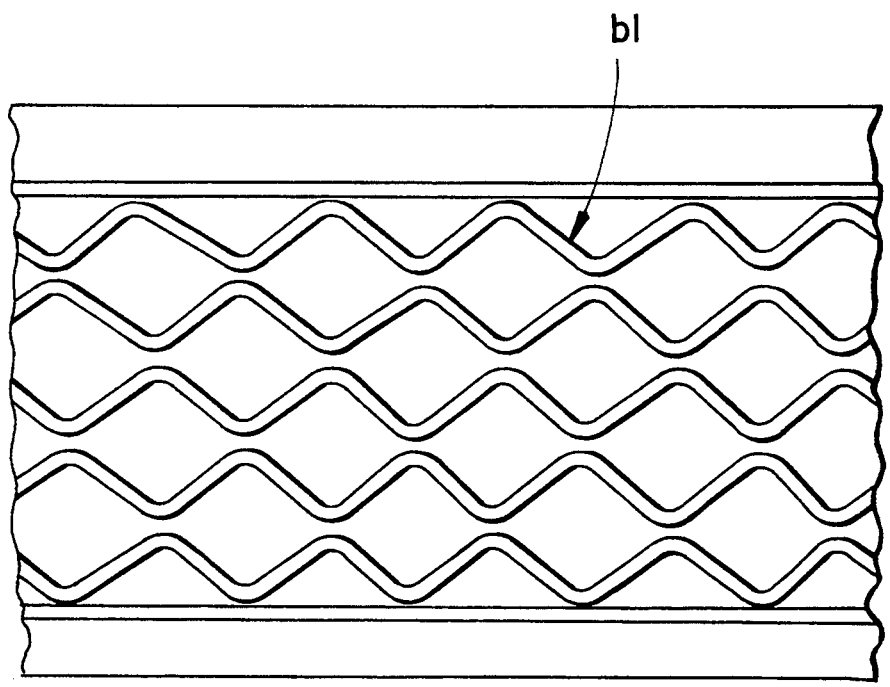
FIG. 7 is a plane view of the doormat represented in FIG. 5.
Figure 8:
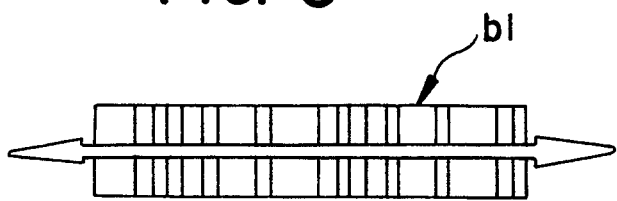
FIG. 8 is a front view of the doormat represented in FIG. 5.
Each (A), (B), (C) and (D) of FIG. 9 is a plane view of the doormat prepared by band having various convexities on the surface thereof.
Figure 9A:
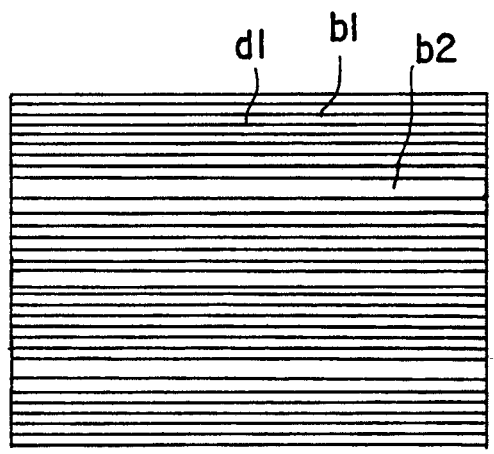
Figure 9C:
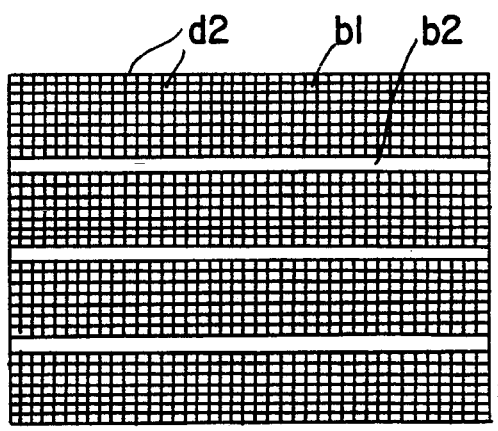
Figure 9B:
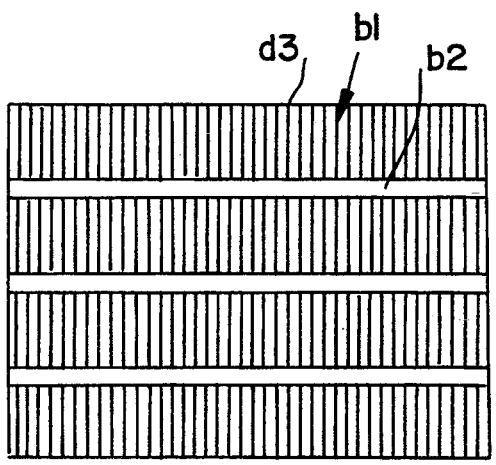
Figure 9D:
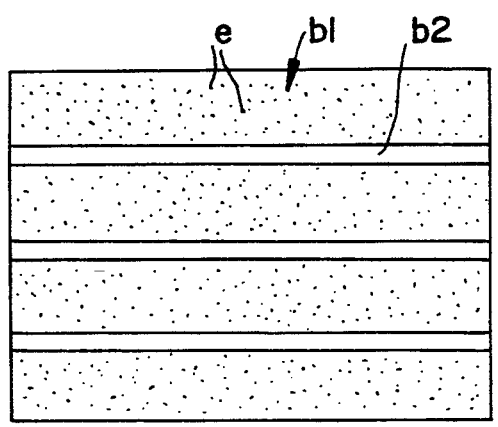

Each FIG. 6, FIG. 7 and FIG. 8 is a side view, a plane view and a front view of the doormat represented in FIG. 5, Also, FIG. 9 is an alternative embodiment of the doormat according to the present invention, Since A of FIG. 9 represents that convexities ($d_1$) are horizontally formed on the surface of corrugated band ($b_1$) and B represents that another convexities ($d_2$) are longitudinally formed on the surface of corrugated band ($b_1$). Also, C represents that convexities ($d_3$) are formed in all directions on the surface of corrugated band ($b_1$) and D represents that dotted convexities such as the surface of orange are irregularly formed. Therefore, slip is prevented at trampling the corrugated band (b₁) in using the doormat.

Therefore, the above doormats have good cushiony effect by space due to corrugation of synthetic resin sheet. Also, it eliminates well muck from the outsole of shoes because of its good restoring force and elasticity. Furthermore, it is convenient and may prevent slip because of various convexities formed on the surface of the corrugated bands.

Figure 10:
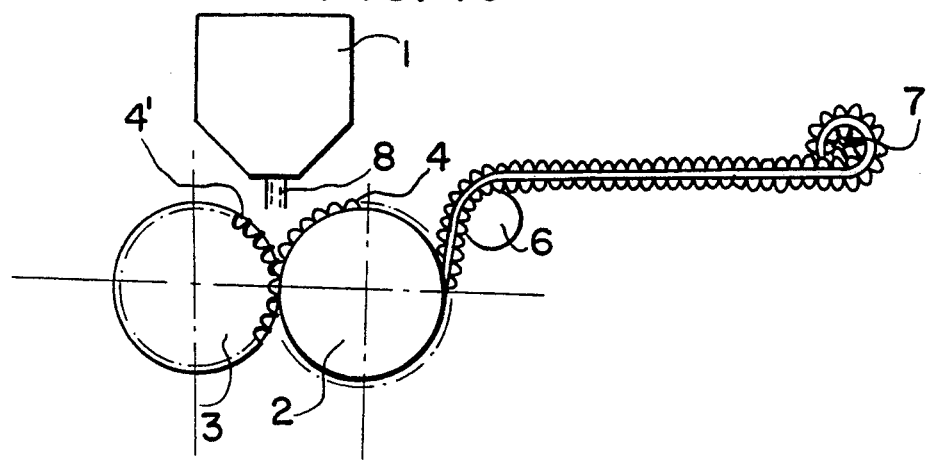
FIG. 10 is a schematic view of the apparatus for preparing the doormat according to the present invention.

FIG. 10 is a schematic view of an apparatus for preparing the doormat according to the present invention. The synthetic resin sheet (8) formed from extrusion dice(1) passes between rollers(2, 3) having the plural protuberances(4, 4') in the lower part of extrusion dice(1), and then it is molded into corrugated shape. Next, it passes by guide roller(6) to take up by take-up roller(7).

Figure 11:
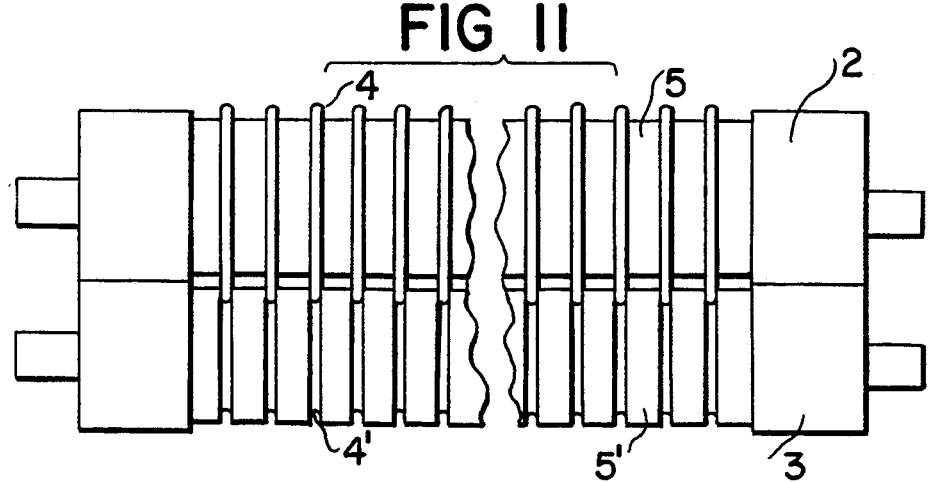
FIG. 11 is a plane view of the roller of the above apparatus.

Also, FIG. 11 is a plane view of the roller of the above apparatus.

As illustrated in FIG. 11 which is a plane view of the roller, the drive roller(2) having plural corrugated protuberances (4) is meshed with the idle roller(3) having plural corrugated protuberandes (4') in the lower part of extrusion dice(1). In the case that the drive roller(2) is rotated, the idle roller(3) is also rotated in attendance on rotation of the drive roller(2). Walls(5, 5') are optionally established between protuberances and a corrugated protuberance(4) formed on the drive roller (2) crosses with the corrugated protuberance(4') formed on the idle drive(3). Since the guide roller(6) is placed near rollers(2, 3), the synthetic resin sheet passed by the guide roller (6) is taken up by take-up roller(7).

Figure 12:
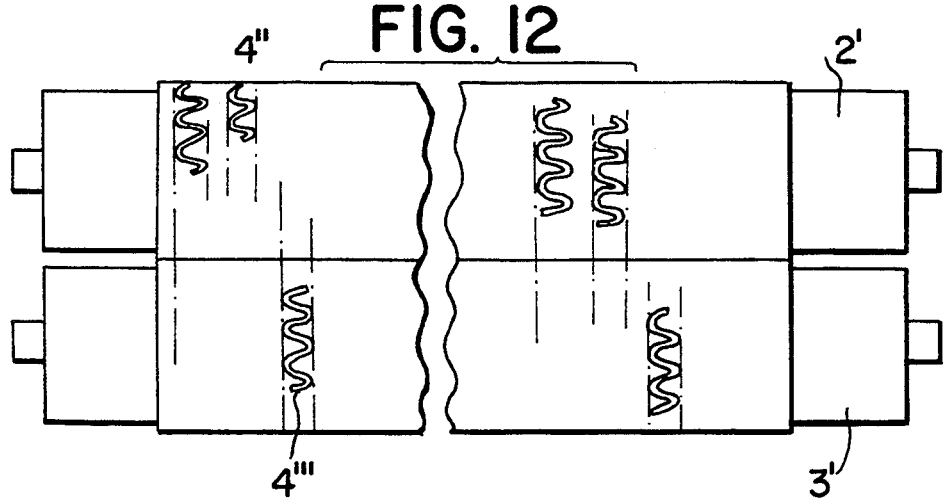
FIG. 12 is a plane view of the alternative roller of the above apparatus.

FIG. 12 is a place view of the alternative roller of the above apparatus. The drive roller(2') having plural corrugated protuberances(4") is meshed with the idle roller(3') having plural corrugated protuberances(4''') in the lower part of extrusion dice(1). In the case that the drive roller 2') is rotated, the idle roller(3') is also rotated in attendance on rotation of the drive roller (2'). Also, a corrugated protuberance(4") formed on the drive roller(2') crosses with the corrugated protuberance (4''') formed on the drive roller(3'). Since the guide roller(6) is placed near rollers(2', 3'), the synthetic resin sheet passed by the guide roller(6) is taken up by take-up roller(7).

The doormat prepared by the above process may be cut in optional size according to use. The structure of apparatus for preparing the above doormat is very simple and the process for preparing the doormat is also easy in the case of use the above apparatus. Accordingly, efficiency of work can be accelerated and the doormat having good qualities can be prepared.

What is claimed is:

1. A doormat comprising a plurality of continuous corrugated bands each having lateral sides which separate each corrugated band from one another to form a linear array of corrugated bands with each band having multiple undulations which form opposed apexes in an arrangement in which the opposed apexes in any one band alternates in an out of phase relationship with the apexes in the corrugated bands on each opposite lateral side thereof and a plurality of straight bands positioned on each opposite lateral side of each corrugated band and spaced apart from the opposed apexes of each corrugated band for connecting the corrugated bands to one another along their lateral sides with the opposed apexes unconnected to the bands so as to provide open space in each of the corrugated bands on opposite sides of each of the straight bands.

2. A doormat according to claim 1, wherein the corrugated bands have different widths.

3. A doormat according to claim 1, wherein the corrugated bands have at least one convex surface geometry.

4. An apparatus for manufacturing a doormat having plural and continuous corrugated bands with multiple undulations alternating between adjacent bands in an out of phase relationship and straight bands for separating the corrugated bands, said apparatus comprising an extrusion die, a drive and idler roller, each having plural corrugated protuberances in the lower part of the extrusion die, a guide roller adjacent the drive and idler rollers and a take-up roller wherein said corrugated protuberances on said drive roller is meshed with said corrugated protuberances on said idler roller.

* * * * *